United States Patent [19]
Ida

[11] Patent Number: 5,814,978
[45] Date of Patent: Sep. 29, 1998

[54] POWER SUPPLY CIRCUIT FOR A PRINTER

[75] Inventor: Koji Ida, Tokyo, Japan

[73] Assignee: Oki Data Corporation, Tokyo, Japan

[21] Appl. No.: 821,943

[22] Filed: Mar. 21, 1997

[30] Foreign Application Priority Data

Mar. 21, 1996 [JP] Japan .................................. 8-091918

[51] Int. Cl.$^6$ .......................... G05F 1/40; G03G 15/16
[52] U.S. Cl. .......................................... 323/282; 399/176
[58] Field of Search .......................... 323/282; 219/216; 361/225; 399/176

[56] References Cited

U.S. PATENT DOCUMENTS

| | | | |
|---|---|---|---|
| 4,420,247 | 12/1983 | Suzuki et al. | 399/46 |
| 5,179,397 | 1/1993 | Ohzeki et al. | 399/168 |
| 5,305,177 | 4/1994 | Aoki et al. | 361/225 |
| 5,465,039 | 11/1995 | Narita et al. | 323/282 |
| 5,646,717 | 7/1997 | Hiroshima et al. | 399/154 |
| 5,682,575 | 10/1997 | Komori | 399/66 |
| 5,684,685 | 11/1997 | Komatsu et al. | 363/95 |
| 5,705,919 | 1/1998 | Wilcox | 323/282 |

*Primary Examiner*—Stuart N. Hecker
*Attorney, Agent, or Firm*—Panitch Schwarze Jacobs & Nadel, P.C.

[57] ABSTRACT

A power supply for use in a printer provides a current progressively small with increasing transfer roller impedance. A reference current section RC sets a voltage Vr indicative of a reference current Ia of an output current Iout of the power supply PS. A voltage generator VG provides an output voltage Vout of the power supply PS. A voltage monitor VM monitors the output voltage to provide a voltage-monitoring signal Vm to an operational section E. The operational section E determines a correction value of the output current Iout on the basis of the voltage Vr and the voltage-monitoring signal Vm. The correction value is progressively small as the voltage-monitoring signal Vm increases. A current controller C controls the voltage generator VG in accordance with an operation result obtained by the operational section E, so that the transfer roller is supplied with a current progressively small with increasing roller impedance but is still charged to a voltage progressively high with increasing roller impedance.

11 Claims, 15 Drawing Sheets

FIG.10

OPTIMUM RANGE FOR NARROW PAPER WIDTH

| Vout (kV) | Iout (μA) | | |
|---|---|---|---|
| | CONDITION 1 | CONDITION 2 | CONDITION 3 |
| 1.2 | 4.9 | — | — |
| 1.4 | 6 | — | — |
| 1.6 | 7.3 | 6.5 | — |
| 1.8 | 8.9 | 7.6 | — |
| 2 | 10.6 | 9 | — |
| 2.2 | 12.5 | 10.6 | — |
| 2.4 | 14.6 | 12.1 | — |
| 2.6 | — | 14 | 10.3 |
| 2.8 | — | 15.8 | 12 |
| 3 | — | — | 13.8 |
| 3.2 | — | — | 15.8 |

PAPER SIZE = 106$^{mm}$ × 146$^{mm}$, POST CARD

FIG.11

OPTIMUM RANGE FOR WIDE PAPER WIDTH

| Vout (kV) | Iout (μA) | | |
|---|---|---|---|
| | CONDITION 1 | CONDITION 2 | CONDITION 3 |
| 1 | — | 2 | — |
| 1.2 | — | 2.3 | — |
| 1.4 | 3 | 3 | — |
| 1.6 | 4.2 | 3.8 | — |
| 1.8 | 5.6 | 4.8 | — |
| 2 | 7.2 | 5.8 | 2 |
| 2.2 | — | 7.6 | 2.5 |
| 2.4 | — | — | 3.1 |
| 2.6 | — | — | 3.6 |
| 2.8 | — | — | 4.3 |
| 3 | — | — | — |

PAPER SIZE = 216$^{mm}$ × 276$^{mm}$, LETTER

FIG.13

OPTIMUM RANGE IN TERMS OF
ROLLER IMPEDANCE

| Vout | Iout ($\mu$A) | |
| --- | --- | --- |
| (kV) | IMPEDANCE 1 (POINT a₂) | IMPEDANCE 2 (POINT b₂) |
| 1.2 | 2.5 | — |
| 1.4 | 3.3 | — |
| 1.6 | 4.2 | — |
| 1.8 | 5.6 | — |
| 2 | 7 | 2.8 |
| 2.2 | — | 3.4 |
| 2.4 | — | 4.1 |
| 2.6 | — | 5.1 |
| 2.8 | — | 6.3 |
| 3 | — | 8 |

$a_1$ : ( Iout = 7 $\mu$A , Vout = 1.1kV )

$b_1$ : ( Iout = 7 $\mu$A , Vout = 1.85kV )

POWER SUPPLY CIRCUIT FOR A PRINTER

BACKGROUND OF THE INVENTION

1. Technical Field of the Invention

The present invention relates to a power supply circuit for use in a printer or the like, and more particularly to a technique for controlling an output current of such a power supply.

2. Description of Related Art

Electrophotographic printers have been widely used as a printer which prints documents and images produced by, for example, computers. FIG. 14 illustrates a general construction of an electrophotographic printer. Prior to the printing of the documents and images, a photosensitive drum 2 is negatively charged by a charging roller 1. Then, a light source such as an LED array illuminates the charged surface of the rotating photosensitive drum 1 to form a latent electrophotostatic image of the document and/or image to be printed. The latent image is developed with toner by a developer 5, which deposits negatively charged toner particles onto the latent image. The toner image developed on the surface of the photosensitive drum 1 is then transferred to the print paper 7 by electrical attraction. For best results of the transferring of the image, a constant electrical attraction must be maintained. The same voltage applied to a transfer roller generates different electrical attractions depending on the electrical impedances of the transfer roller 4 and print paper 7. Roller impedance varies from roller to roller and paper impedance varies from paper to paper. The impedances of the roller 4 and paper 7 also vary in accordance with ambient temperatures and humidities. Therefore, the voltage applied to the transfer roller 4 must be varied in accordance with changes in the impedances of the transfer roller and paper in order to obtain quality printing.

FIG. 15 illustrates the relationship between the current supplied to the transfer roller 4 and the voltage resulted from the current during printing operation. The print paper is assumed to have wide widths. Referring to FIG. 15, solid line portions of Curves $C_H$, $C_N$, and $C_L$ show optimum ranges of the current and voltage supplied to the transfer roller for different environmental conditions. For environments of high temperatures and high humidities (low roller impedances), a constant current of Ic provides a transfer voltage $V_H$ which falls in the optimum range depicted by Curve $C_H$ and results in a good transferring of the images. For environments of normal ambient temperatures (medium roller impedances), the constant current of Ic provides a transfer voltage of $V_N$ which is still within the optimum range depicted by Curve $C_N$. For environments of low temperatures and low humidities (high roller impedances), the constant current Ic results in a transfer voltage of $V_L$. The voltage $V_L$ falls outside of the optimum range depicted by Curve $C_L$, resulting in a poor transferring of the images.

FIG. 15 indicates that the current supplied to the transfer roller must be varied according to different environments (i.e., different roller impedances) so that optimum voltages are supplied to the roller in accordance with various operating conditions.

However, a conventional power supply used in a printer or the like can supply only a fixed amount of current regardless of changes in environmental conditions such as ambient temperatures and humidities.

The conventional power supply also presents a problem that the printer still operates sufficiently at low printing speeds but does not at high printing speeds since the range of optimum transfer voltage becomes progressively narrow with increasing printing speed. FIG. 16 illustrates the voltage-current characteristics for different printing speeds. The regions a–b and c–d are optimum ranges for different printing speeds. It is to be noted that the optimum voltage range $V_H$ for high speed is narrower than the optimum voltage range $V_L$ for low speed. It is also to be noted that current range is higher for high speed than for low speed. Thus, the transfer voltage determined by a constant current does not always provide optimum transfer voltages under varying environmental conditions.

SUMMARY OF THE INVENTION

An object of the invention is to provide a power supply for use in an electrophotographic printer where the transfer roller is charged to a voltage sufficiently in the middle of its optimum operating range of voltage-current characteristic.

Another object of the invention is to provide a power supply for use in an electrophotographic printer where print quality is ensured regardless of environmental conditions.

Roller impedance varies from roller to roller and paper impedance varies from paper to paper. The impedances of the roller and paper also vary in accordance with ambient temperatures and humidities. Therefore, the voltage applied to the transfer roller must be varied in accordance with changes in the impedances of the transfer roller and paper in order to obtain quality printing.

A reference current section RC sets a voltage Vr indicative of a reference current Ia of an output current Iout of the power supply supplied to a transfer roller. A voltage generator VG provides an output voltage Vout of the power supply. A voltage monitor VM monitors the output voltage to provide a monitor voltage Vm to an operational section E. The operational section E determines a value of the output current Iout on the basis of the reference current Vr and the monitor voltage Vm. The value of the output current Iout is progressively small as the monitor voltage Vm increases. A current controller C controls the voltage generator VG in accordance with an operation result obtained by the operational section E, so that the transfer roller is supplied with a current progressively small with increasing roller impedance but is still charged to a voltage progressively high with increasing roller impedance.

The power supply PS further includes a current monitor CM produces a current-monitoring signal Vc indicative of the output current Iout. The current controller C compares the current-monitoring signal Vc with the correction value ΔV to provide a larger amount of output current to the transfer roller if the current-monitoring signal Vc is higher than the correction value ΔV, and a smaller amount of output current to the transfer roller if the current-monitoring signal Vc is lower than the correction value ΔV.

The power supply PS still further includes a reference current section RC which sets the reference current for the output current Iout supplied to the external circuit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 10 illustrates a table which lists various values of output current Iout for output voltage Vout according three environmental conditions when printing narrow paper;

FIG. 11 illustrates a table which lists various values of output current Iout for output voltage Vout according to three environmental conditions when printing wide paper;

FIG. 13 illustrates values of output current Iout for output voltage Vout according to two impedances;

DESCRIPTION OF THE PREFERRED EMBODIMENTS

The present invention will be described in detail by way of preferred embodiments.

First Embodiment

Figure 1:
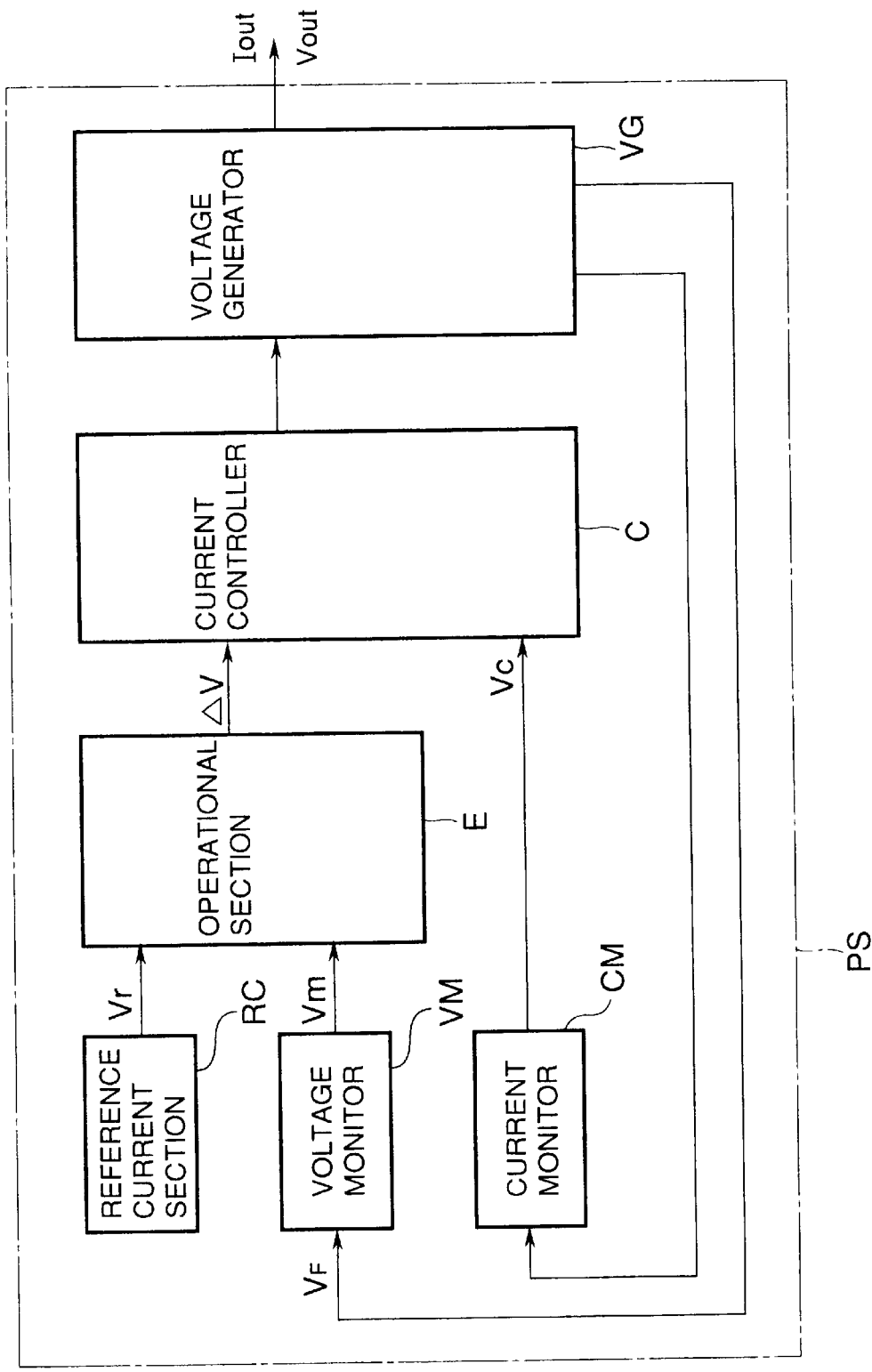
FIG. 1 is a block diagram showing a power supply PS according to a first embodiment of the present invention.

FIG. 1 is a block diagram showing a power supply PS according to a first embodiment of the present invention. The power supply PS includes a reference current section RC, voltage monitor VM, current monitor CM, operational section E, current controller C, and voltage generator VG. The reference current section RC provides a reference value Vr of the output current Iout of the power supply PS. The voltage monitor VM feeds back changes Vm in the output voltage of the power supply PS. The current monitor CM feeds back changes Vc in the output current Iout of the power supply PS to the current controller C. The operational section E performs an operation to produce a voltage $\Delta V$ as a correction voltage from the voltage-current characteristics shown in FIG. 3 on the basis of the reference current Vr and a change Vm in output voltage Vout, thereby determining a reference value of the current Iout to be outputted. The current controller C controls the voltage generator VG in accordance with the current Iout to be outputted, so that the voltage generator VG outputs a controlled voltage Vout to an external circuit.

Figure 2:
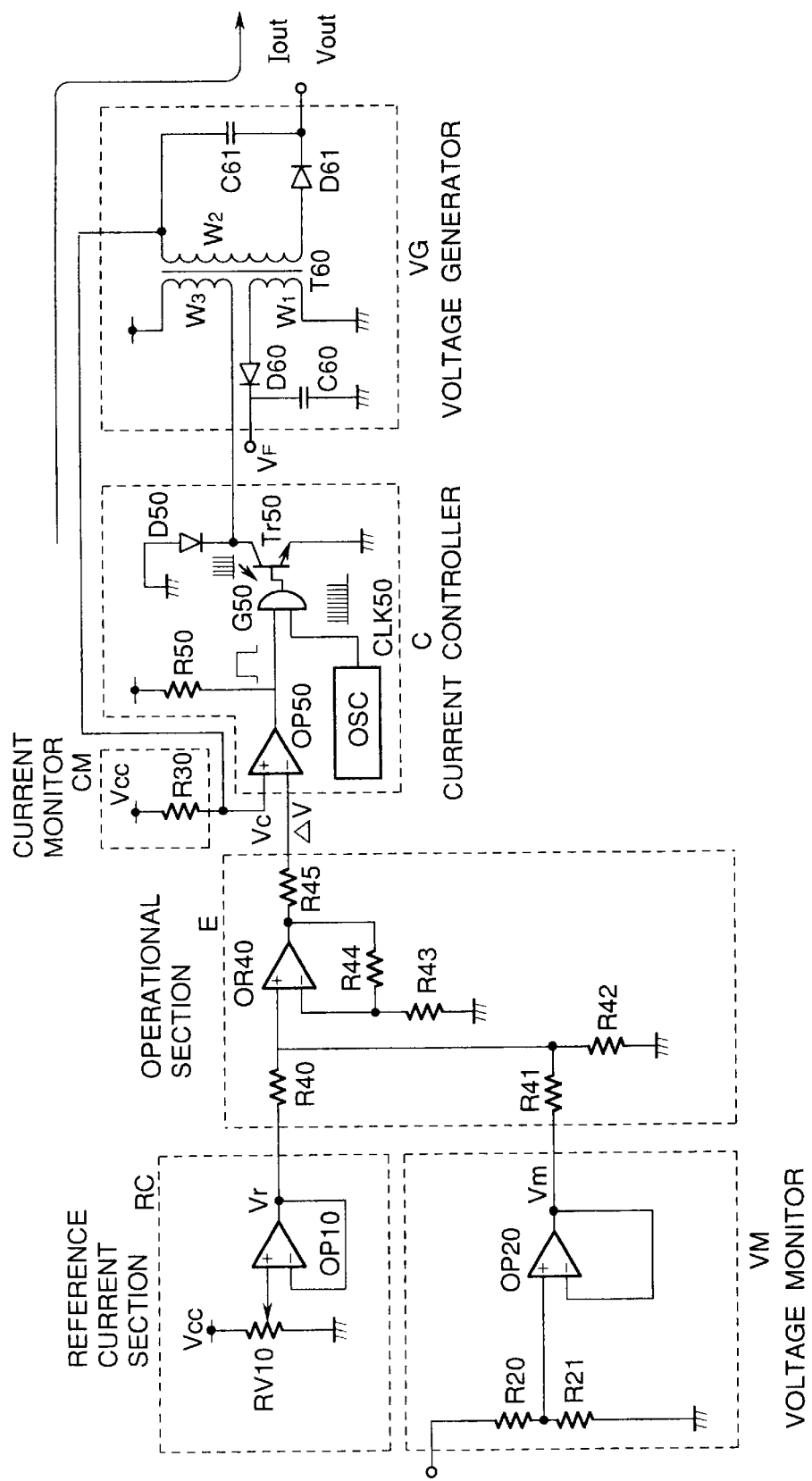
FIG. 2 is a schematic diagram of the power supply shown in FIG. 1.

FIG. 2 is a schematic diagram of the power supply shown in FIG. 1. The reference current section RC primarily includes an OP amplifier OP10 and variable resistor RV10. The voltage monitor VM primarily includes an OP amplifier OP20 and resistors R20 and R21. The operational section E includes an OP amplifier OP40 and resistors R40–R45. The current controller C primarily includes an OP amplifier OP50, transistor Tr50, resistor R50, fly-wheel diode D50, oscillator circuit CLK50, and AND gate G50. The voltage generator VG primarily includes a transformer T60, diodes D60–D61, and capacitors C60–C61. The current monitor CM is a resistor R30 through which the Iout flows.

The operation of the power supply of the first embodiment will be described with reference to FIGS. 2 and 3.

Referring to FIG. 2, in order to provide an optimum output current to the transfer roller when printing on paper having a certain size, the reference current section RC outputs a reference current expressed by the reference voltage Vr which can be set by adjusting the variable resistor RV10 at the factory. The reference voltage Vr is outputted to the operational section E. The operational section E is a weighted summer which adds the reference voltage Vr to the monitor voltage Vm multiplied by K2 to produce the voltage $\Delta V$. The operational section E outputs the voltage $\Delta V$ to the current controller C.

In the voltage generator VG, voltages are induced across windings W1–W3 due to the switching operation of the transistor Tr50. The voltage across the winding W1 is rectified by the diode D60 and smoothed by the capacitor C60, and is then outputted as a voltage $V_F$ to the voltage monitor VM. The value of the voltage $V_F$ is determined by the ratio of turns of windings of the T60 and is proportional to the output voltage Vout of the power supply PS. The voltage $V_F$ is divided by the resistors R20 and R21 in the voltage monitor VM, and the amplifier OP20 outputs the divided voltage as a monitor voltage Vm.

Figure 3:
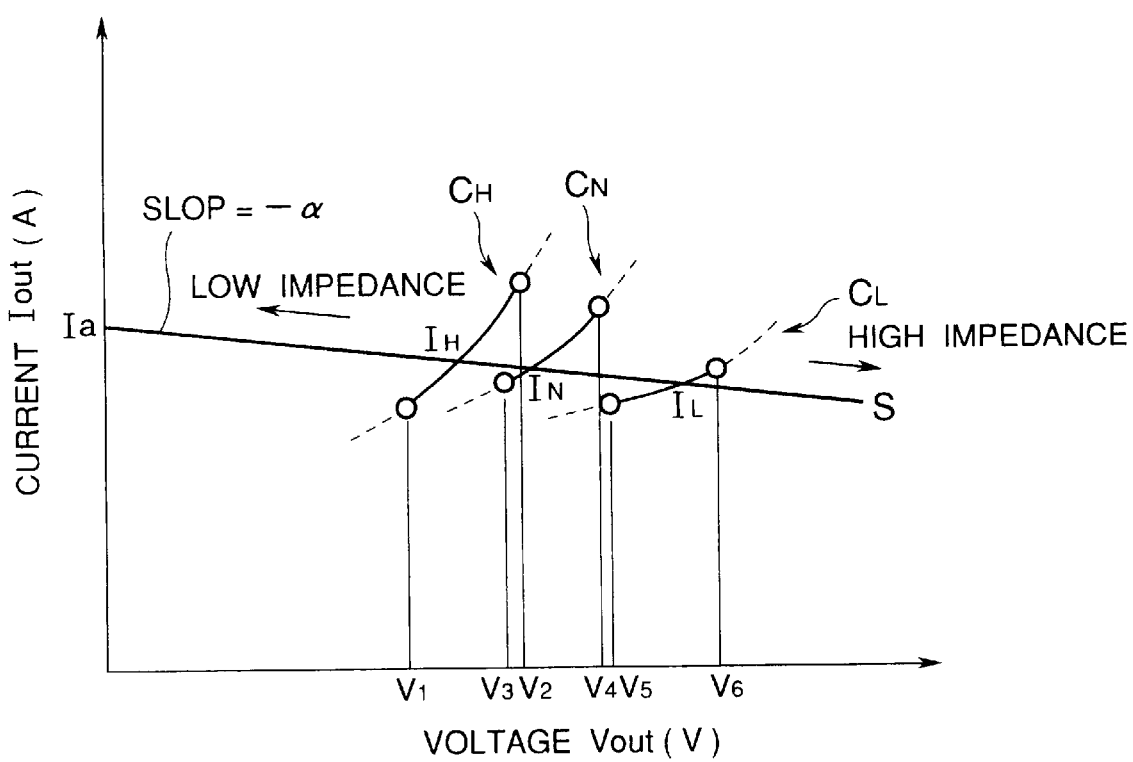
FIG. 3 illustrates the relationships between the output voltage and output current of the power supply PS according to the first embodiment, showing three different environmental conditions.

FIG. 3 illustrates a voltage-current characteristic $\underline{S}$ of the power supply PS when a transfer roller is charged by the power supply PS and paper having a wide width is being printed. The operating point of the power supply PS, i.e., the output current and output voltage move along the line S, toward the right end for higher impedances and toward the left end for lower impedances. Referring to FIG. 3, Curves $C_H$, $C_N$, and $C_L$ represent the voltage-current characteristics of the transfer roller alone, showing the relationships between currents supplied to the transfer roller and the voltages corresponding to the currents for three different roller impedances; high impedance, medium impedance, and low impedance. The three different impedances result from three different environmental conditions of the transfer roller, i.e., high temperature/-high humidity, normal temperature/normal humidity, and low temperature/low humidity. Solid line portions of Curves $C_H$, $C_N$, and $C_L$ indicate optimum ranges of the voltage-current characteristics where acceptable printing results can be obtained. When the roller impedance is low, the transfer roller must be charged at a voltage between V1 and V2. When the roller impedance is medium, the transfer roller must be charged at a voltage between V3 and V4. When the roller impedance is high, the transfer roller must be charged at a voltage between V5 and V6. Line S intersects Curves $C_H$, $C_N$, and $C_L$ somewhere on the solid line portions of the respective curves. These intersections ($I_H$, $I_N$, and $I_L$) are operating points where the transfer roller is actually driven by the power supply PS.

It is to be noted that the value of the output current Iout at the intersection is lower for higher roller impedances and high for lower roller impedances.

The operation of the current controller C will be described with reference to FIGS. 2 and 4.

Figure 4:
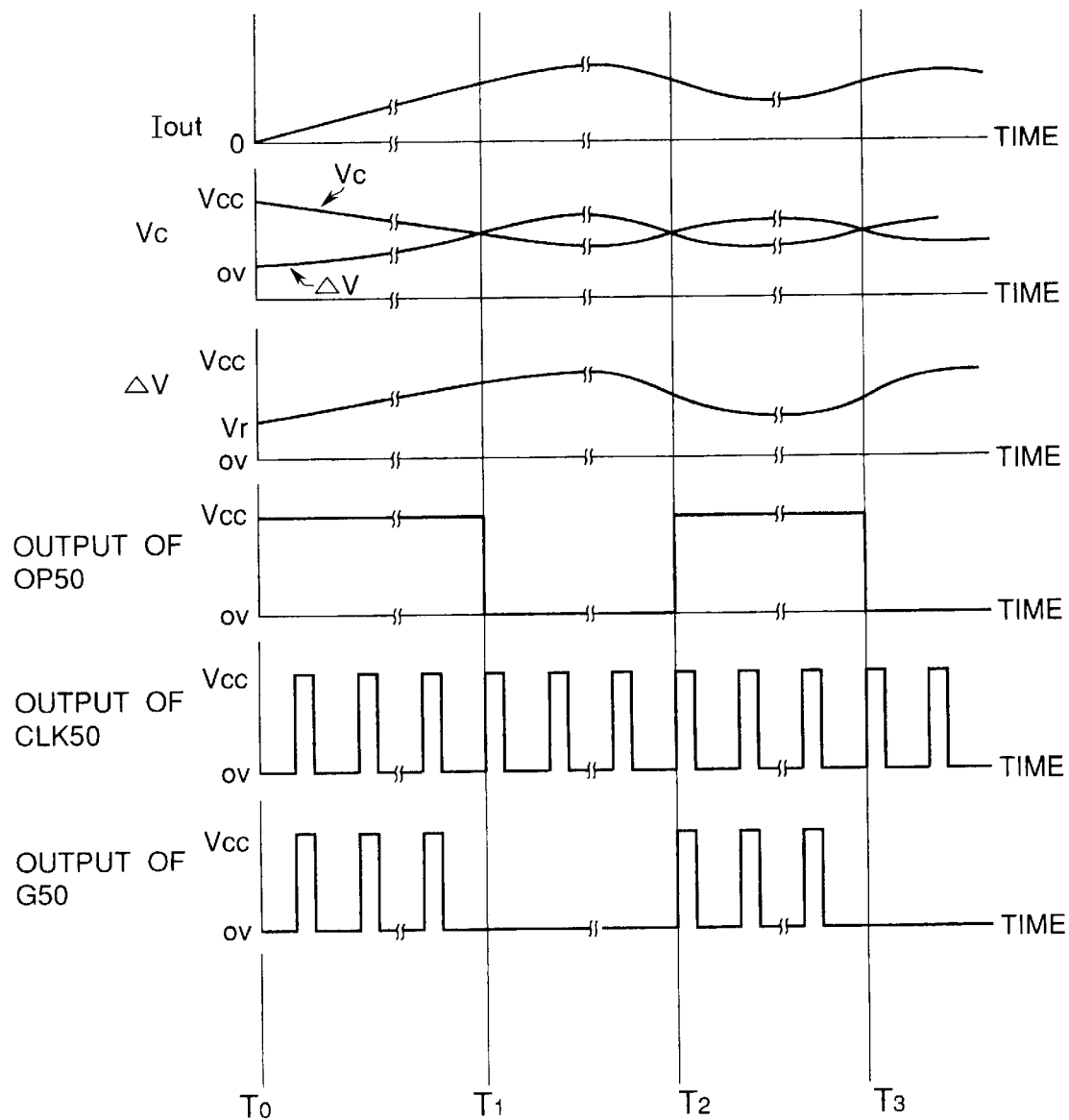
FIG. 4 illustrates the relationships among Iout, Vc, $\Delta V$, output of OP50, output of CLK50, and output of G50 of the power supply of a second embodiment.

FIG. 4 illustrates the relationships among Vc, ΔV, output of the OP amplifier OP50, output of the oscillator CLK50, output of the AND gate G50, and output current Iout supplied to the transfer roller.

Referring to FIG. 2, the Vc indicates the value of the output current Iout being supplied to the transfer roller. Immediately after the power supply PS is turned on at time T0 in FIG. 4, the output of the OP amplifier OP50 is high causing the transistor Tr50 to be switched on and off by the output of the AND gate G50. Thus, the output current Iout starts to increase from zero as depicted by Iout in FIG. 4. The voltage Vc also starts to decrease from Vcc. On the other hand, the output voltage Vout starts to increase from zero and thus the Vm starts to increase. Since the Vm increases, the ΔV also starts to increase from the Vr. The voltage Vc going down and the ΔV going up will become the same voltage at time T1 in FIG. 4 at the intersection of Line S and the corresponding one of the curves. As is clear from FIG. 3, the same amount of output current will charge the transfer roller to a voltage progressively high with increasing impedance of the transfer roller in accordance with environmental condition. Therefore, the voltage Vc going down and the ΔV going up will reach a voltage progressively high with increasing roller impedance. Higher values of the voltage Vc imply smaller output currents and therefore smaller output currents can still charge the transfer roller to higher voltages. This circuit operation accounts for the fact that the power supply PS can be operated at smaller currents to achieve higher output voltage of the power supply PS, i.e., higher voltages of the transfer roller. After time T1, Vc<ΔV and the rate of increase in Iout progressively decreases and then the Iout starts to decrease so that the Vc starts to slowly increase.

The Vc finally becomes again higher than the ΔV shortly after time T2. Then, the OP amplifier OP50 outputs a high level which causes the transistor Tr50 to be switched on and off. Thus, the rate of decrease in Iout after time T2 progressively decreases, and subsequently the Iout slowly increases so that the Vc starts to slowly decrease.

Thereafter, the amplifier OP50 outputs a high level if Vc>ΔV and a low level if Vc<ΔV. The high level causes the transistor Tr50 to be switched on and off by the oscillator CLK50, thereby increasing the output current Iout. The low level stops the switching operation of the transistor Tr50, thereby decreasing the output current Iout. Thus, the output current Iout will be increased or decreased back and forth about the intersection along the corresponding one of the curves $C_H$, $C_N$, and $C_L$, the output current Iout being increased if Vc>ΔV and decreased if Vc<ΔV.

The reference voltage Vr represents the value of $I_a$ in FIG. 3. The slope α of Line S may be set at will by carefully selecting the magnitude of the Vm and K2.

Parameters of the operational section E are determined as follows:

The voltages Vr, Vm, and ΔV are related as follows.

$$\Delta V = K1 \cdot Vr + K2 \cdot Vm \tag{1}$$

The resistors R40–R44 and coefficients K1 to K3 are related as follows:

$$R42=R44$$

$$K1+K2=K3$$

$$K1=R42/R40$$

$$K2=R42/R41$$

$$K3=R42/R43$$

The voltage ΔV determined by the aforementioned parameters is outputted to the current controller CM. The coefficients K1 and K2 will be described later in detail. The output current Iout flows through the resistor R30 and therefore the current monitor CM converts the output current Iout of the power supply PS into the voltage Vc. The voltage ΔV is supplied to the negative input terminal of the OP amplifier OP50 of the current controller C and the voltage Vc to the positive input terminal. The voltage Vc and the output current Iout are in the following relation.

$$Vc = Vcc - R30 \cdot Iout \tag{2}$$

where Vcc is the supply voltage for the current monitor CM.

The coefficients K1 and K2 of the operational section E will now be described.

The output current Iout is increased or decreased with reference to the value of the voltage ΔV produced on the basis of the Vr and K2·Vm.

In order to properly control the output current Iout in accordance with varying environmental conditions, we need to determine the voltage-current characteristic of the power supply PS, i.e., Line S shown in FIG. 3. If K1=1, the voltages Vr, ΔV, and Vm are in the following relation.

$$\Delta V = Vr + K2 \cdot Vm \tag{3}$$

Line S can be expressed as follows:

$$Iout = Ia - \alpha \cdot Vout \tag{4}$$

where Iout is an output current of the power supply PS for a given output voltage Vout, −α is the slope of the line S, and $I_a$ is the output current when the output voltage Vout is zero volts.

The magnitude of $I_a$ is determined by the reference voltage Vr outputted from the reference current section RC. From Equation (2), the relation between the $I_a$ and Vr is given as follows:

$$Vr = Vcc - R30 \cdot I_a \tag{5}$$

Using the relation expressed by Equation (5), the variable resistor RV10 is adjusted to set a reference current in the form of Vr.

The slope α is determined by the Vm and K2.

The monitor voltage Vm is determined by both the dividing ratio set by the resistors R20 and R21 and the ratio of turns of the windings of the transformer T60, and is set to an appropriate value which can be handled by the operational section E. The output voltage Vout of the power supply PS and the monitor voltage Vm are related as follows:

$$Vout = b \cdot Vm \tag{6}$$

where b is determined by the ratio of turns of the windings W1 and W2 of the transformer T60 and the values of the resistors R20 and R21.

Putting Equations (2) and (6) into Equation (4), the following relation is obtained.

$$Vc = Vr + \alpha \cdot b \cdot R30 \cdot Vm \tag{7}$$

From Equations (3) and (7), the following relation is derived.

$$K2 = \alpha \cdot b \cdot R30$$

Using this relation, the values of the resistors R40–R44 can be determined, thereby determining the voltage-current relation of Line S̲ for the proper transfer operation of the printer.

Second Embodiment

The power supply PS of a second embodiment will be described with reference to a block diagram shown in FIG. 5.

Figure 5:
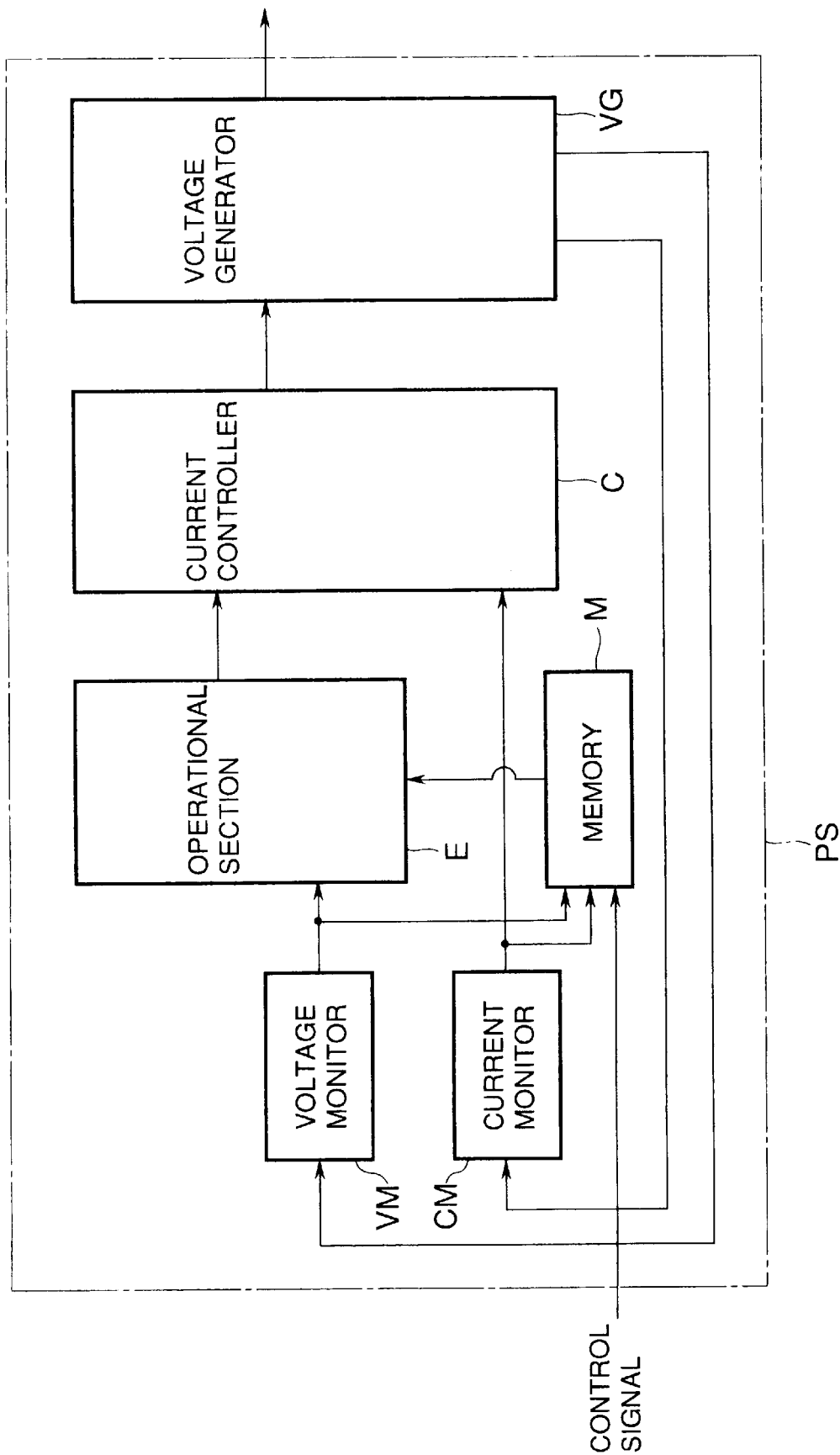
FIG. 5 is a block diagram showing a power supply PS according to the second embodiment.

Referring to FIG. 5, Just as the first embodiment, the power supply PS includes a voltage monitor VM, current monitor CM, operational section E, current controller C, voltage generator VG and memory M. The reference current section RC is not used. The memory M stores various curves of voltage-current characteristic S̲. The sections E and C include circuits such as logic circuits, and the sections VM and CM include circuits such as A/D converter, not shown. In particular, the operational section E has associated circuits such as a CPU (Central Processing Unit) and clock generator, not shown.

The operation of the second embodiment will be described as follows: The voltage generator VG operates exactly the same way as in the first embodiment. The voltage monitor VM and current monitor CM detect the output voltage Vout and output current Iout, respectively, and provide the Vm and Vc, respectively, in the form of digital data.

The second embodiment differs from the first embodiment in that the operational section E handles the digital data. The digital operation is advantageous in that operational equations can be changed quickly and easily.

The operational section E performs the following operation.

$$\Delta V = Vr + K2 \cdot Vm \quad (3)$$

Figure 7:
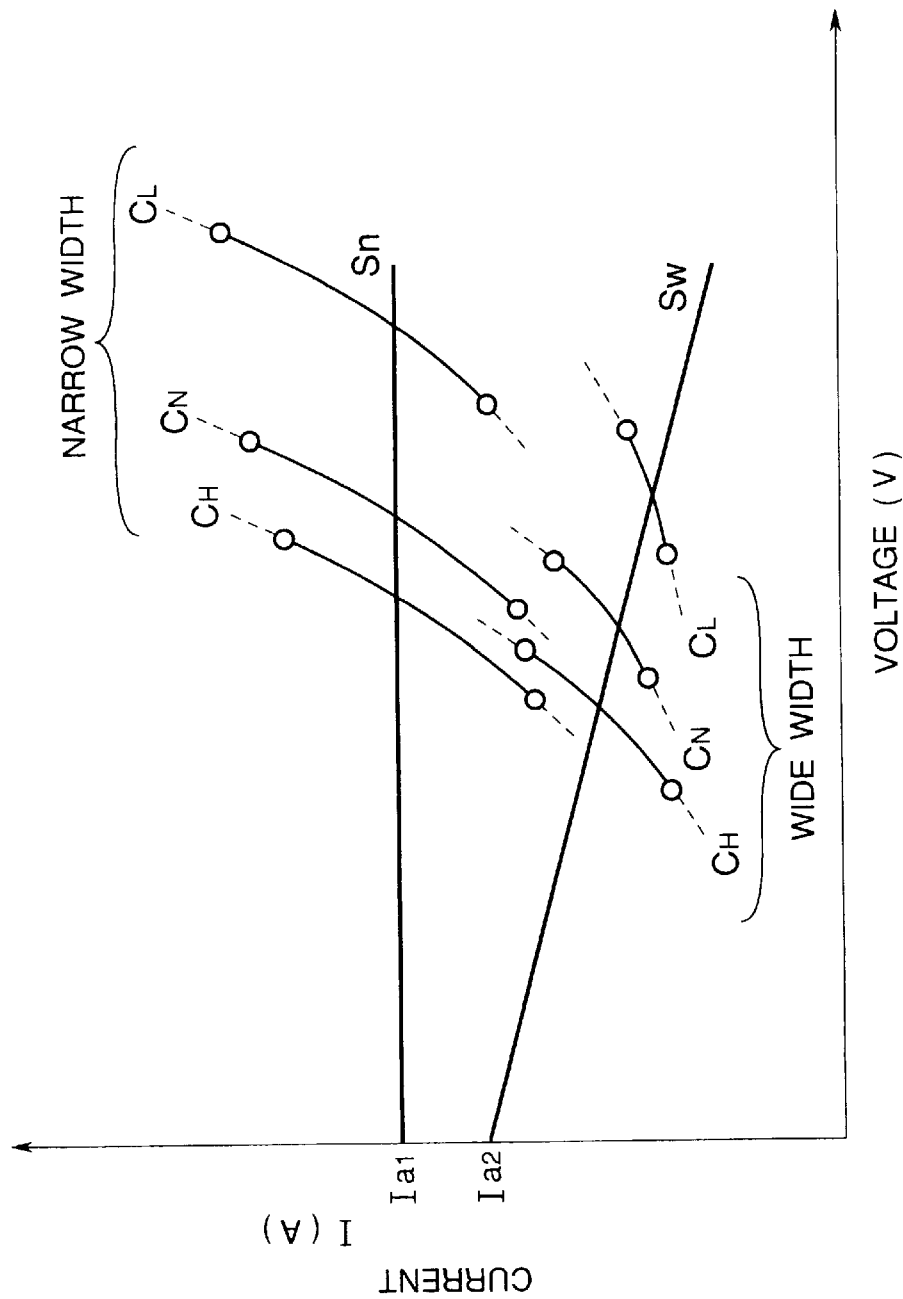
FIG. 7 illustrates the voltage-current characteristics of the power supply PS according to the second embodiment when the paper width is narrow and when the paper width is wide.
Figure 12:
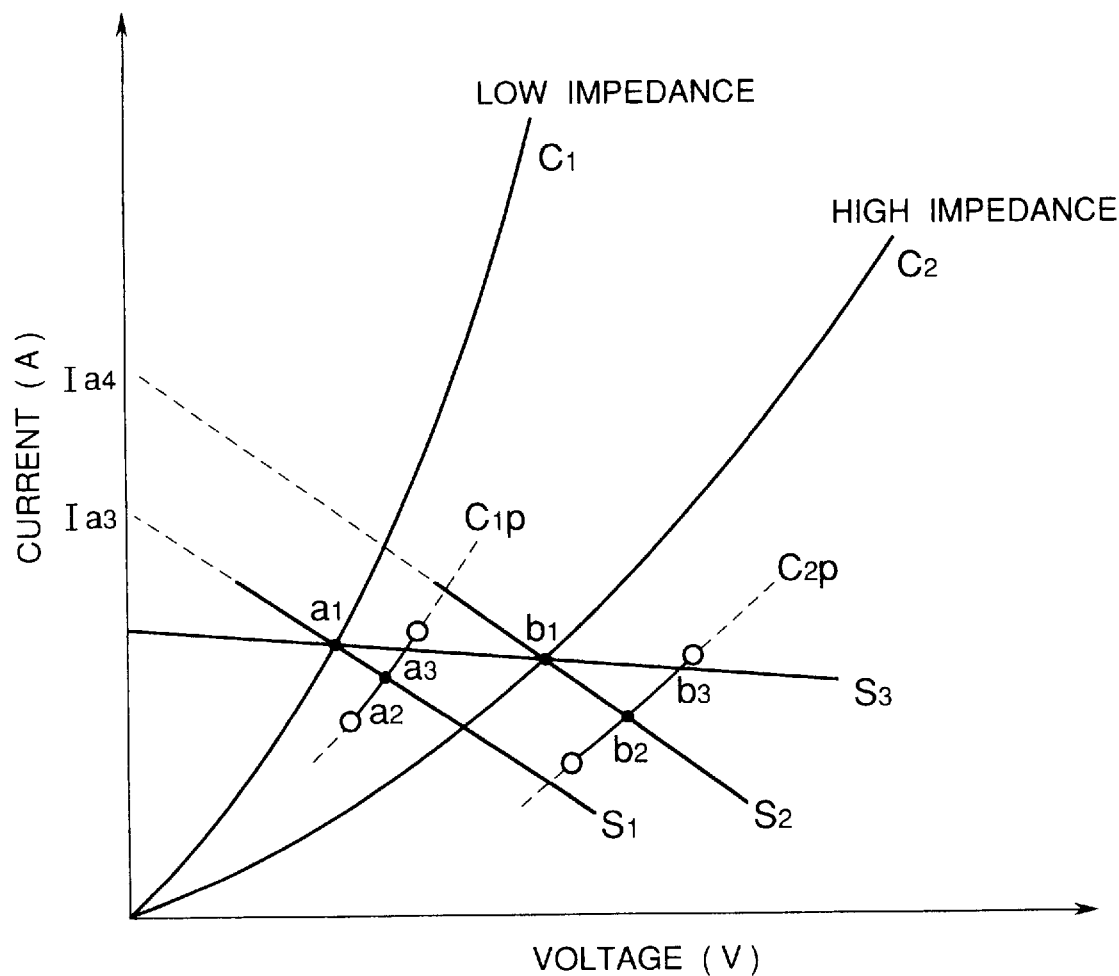
FIG. 12 illustrates the voltage-current characteristics for high and low roller impedances before and during the printing operation.
Figure 14:
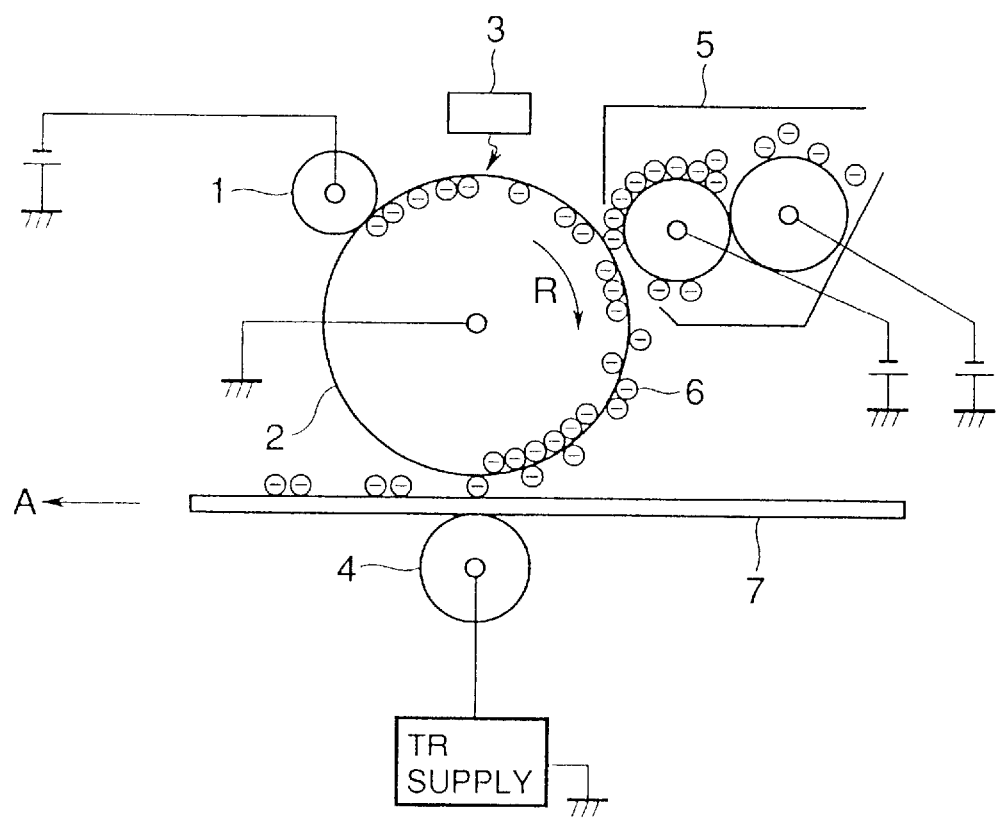
FIG. 14 illustrates a general construction of a conventional electrophotographic printer.
Figure 15:
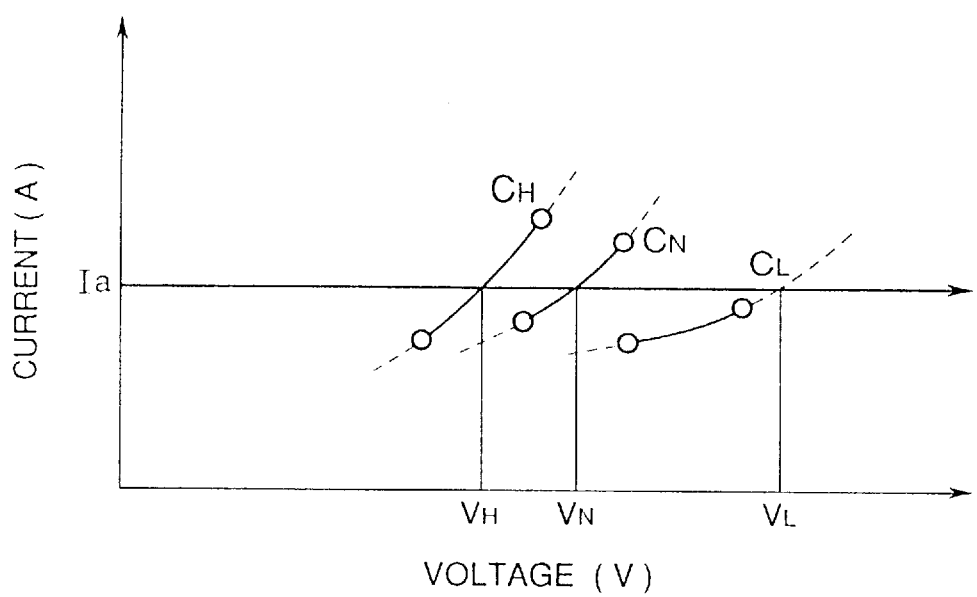
FIG. 15 illustrates the voltage-current characteristic of the conventional power supply.
Figure 16:
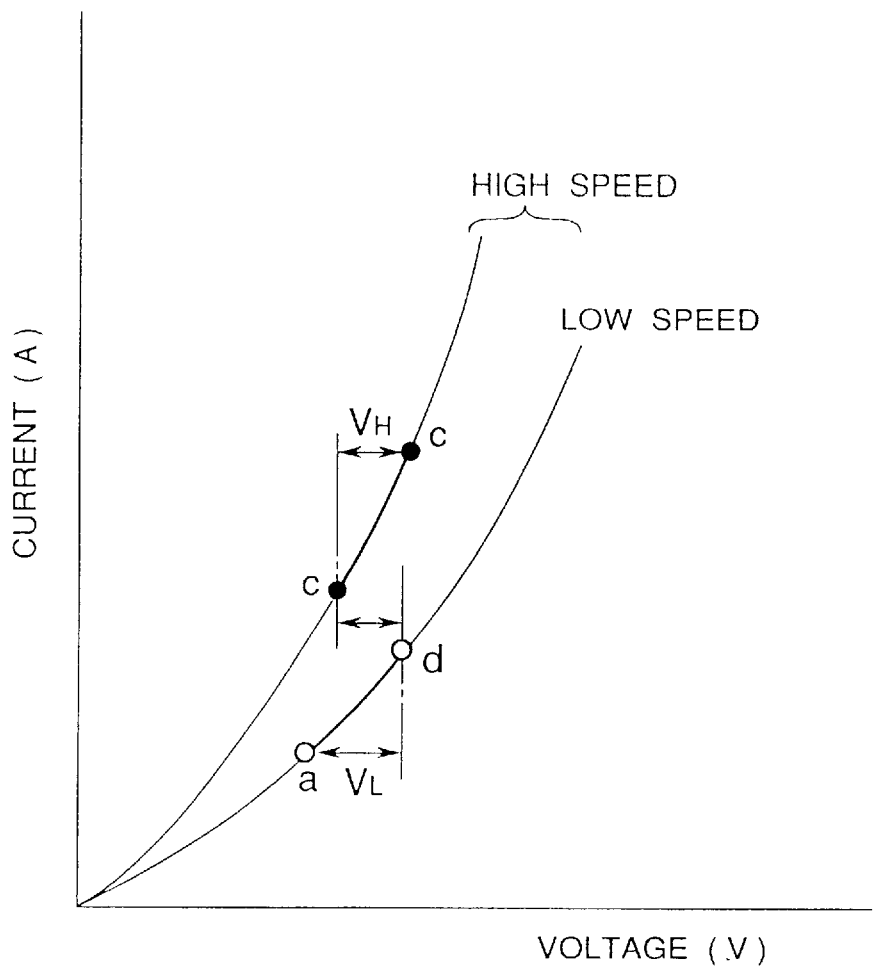
FIG. 16 illustrates the voltage-current characteristics of the conventional power supply, showing curves for high and low speed printing operations.

The voltage monitor VM provides the digital value of the Vm to a multiplier 240 which is in the form of a logic circuit formed in the operational section E. The memory M stores the values of K2 and Vr for Equation (3) which determine the voltage-current characteristic such as Line S̲ in FIG. 3. The various values of K2 and Vr are used for various voltage-current characteristics including characteristics $S_w$ for paper of wide widths and $S_n$ for paper of narrow widths which are shown in FIG. 7, $S_1$ for printing operation in accordance with lower roller impedances and $S_2$ for printing operation in accordance with higher roller impedances which are shown in FIG. 12. These characteristics $S_w$, $S_n$, $S_1$, and $S_2$ will be described later.

Figure 6:
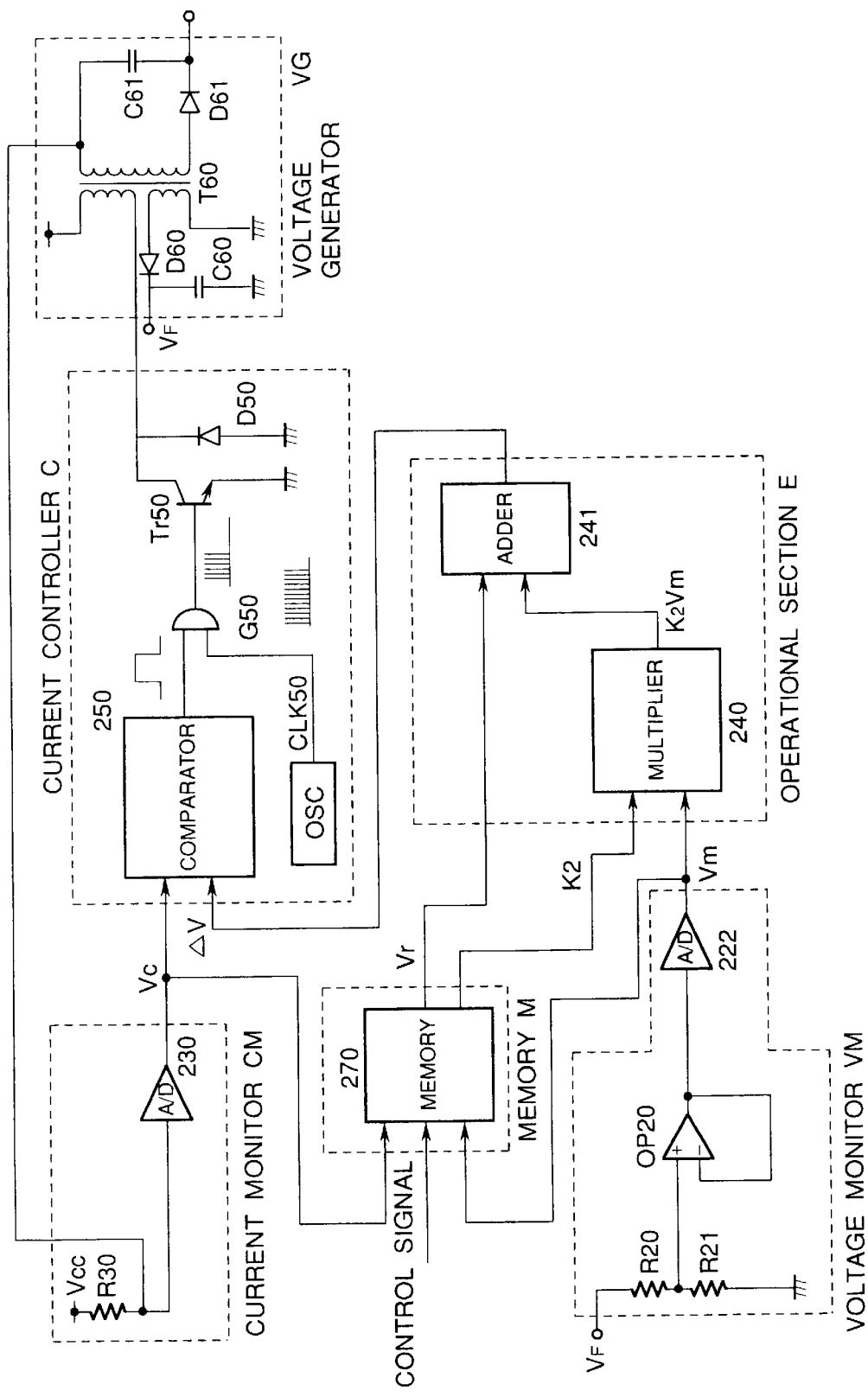
FIG. 6 is a schematic diagram of the power supply shown in FIG. 5.

FIG. 6 is a schematic diagram of the power supply PS shown in FIG. 5. Under the control of the printer controller PC (FIG. 9), the multiplier 240 multiplies the digital data Vm by a digital value K2 selected from the memory M, and outputs the result to the adder 241. The adder 241 adds the digital value Vr read from the memory M and the output K2Vm of the multiplier 240, and outputs the added value, i.e., digital value ΔV to the operational section E.

The comparator 250 in the current controller C compares the ΔV with the digital output Vc outputted from the current monitor CM. The comparator 250 outputs a low level (zero volts) when ΔV>Vc, and a high level (Vcc) when ΔV<Vc. The output of the comparator 250 is directed to one of the inputs of the AND gate G50. The operation hereafter is the same as that in the first embodiment.

The digital operation of the second embodiment allows the following operations.

FIG. 10 illustrates a table which lists various values of output current Iout for output voltage Vout according to three environmental conditions when printing narrow paper paper widths. From the listed data, Line Sn for wide paper is expressed by Iout (μA)=12.

FIG. 11 illustrates a table which lists various values of output current Iout for output voltage Vout according three environmental conditions when printing wide paper.

From the listed data, Line Sw for wide paper is expressed by $$Iout\ (\mu A) = -1.0 \cdot Vout\ (kV) + 6.0$$

In FIGS. 10 and 11, the following conditions are assumed:

Condition 1: 28° C. R.H. 80%

Condition 2: 24° C. R.H. 65%

Condition 3: 10° C. R.H. 20%

Roller impedance: $4.2 \times 10^8\ \Omega$

<For paper having different widths>

The width of the print paper is one of the factors that determine the optimum voltage-current characteristic of the power supply PS.

Figure 8:
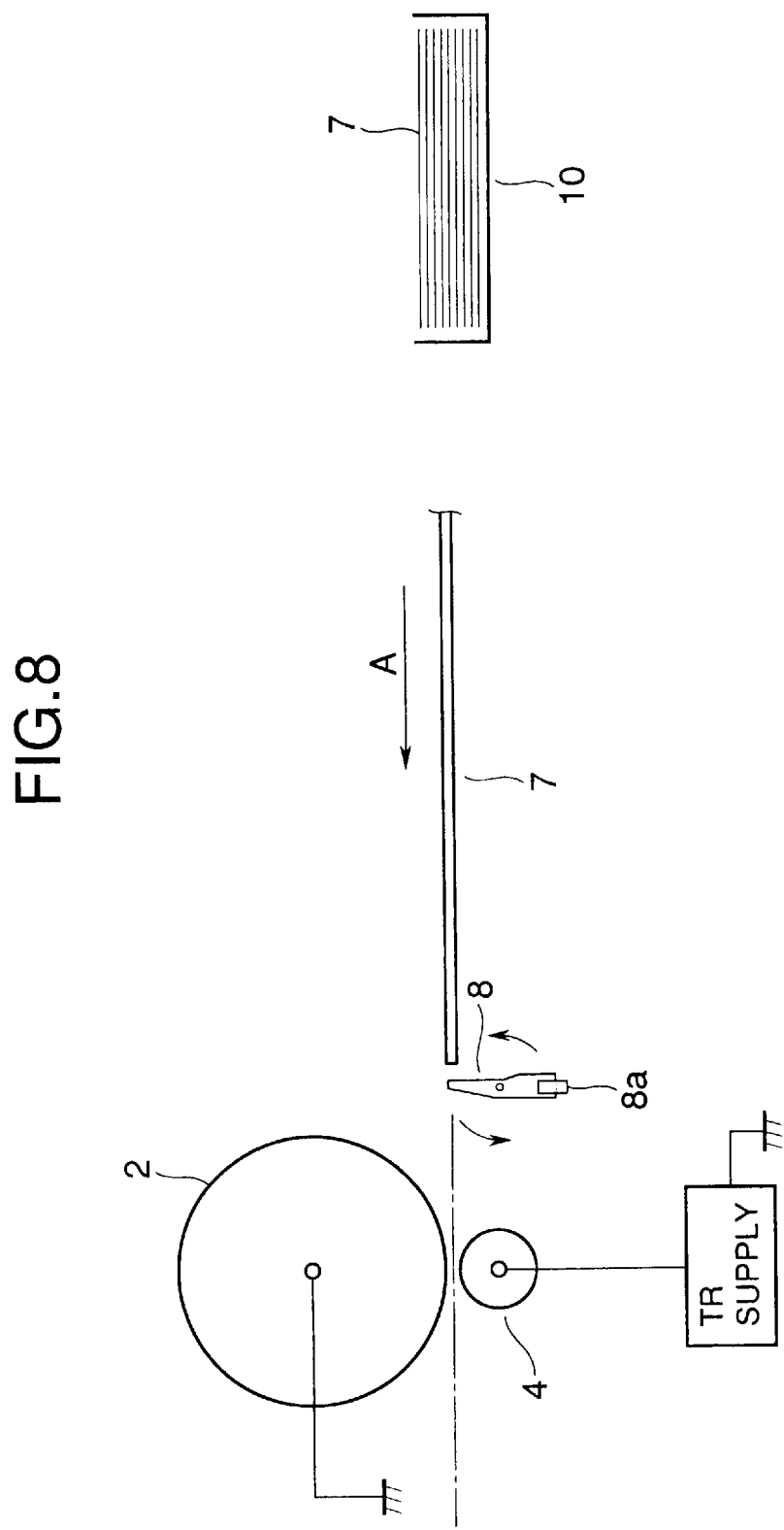
FIG. 8 illustrates the paper sensor of the second embodiment.
Figure 9:
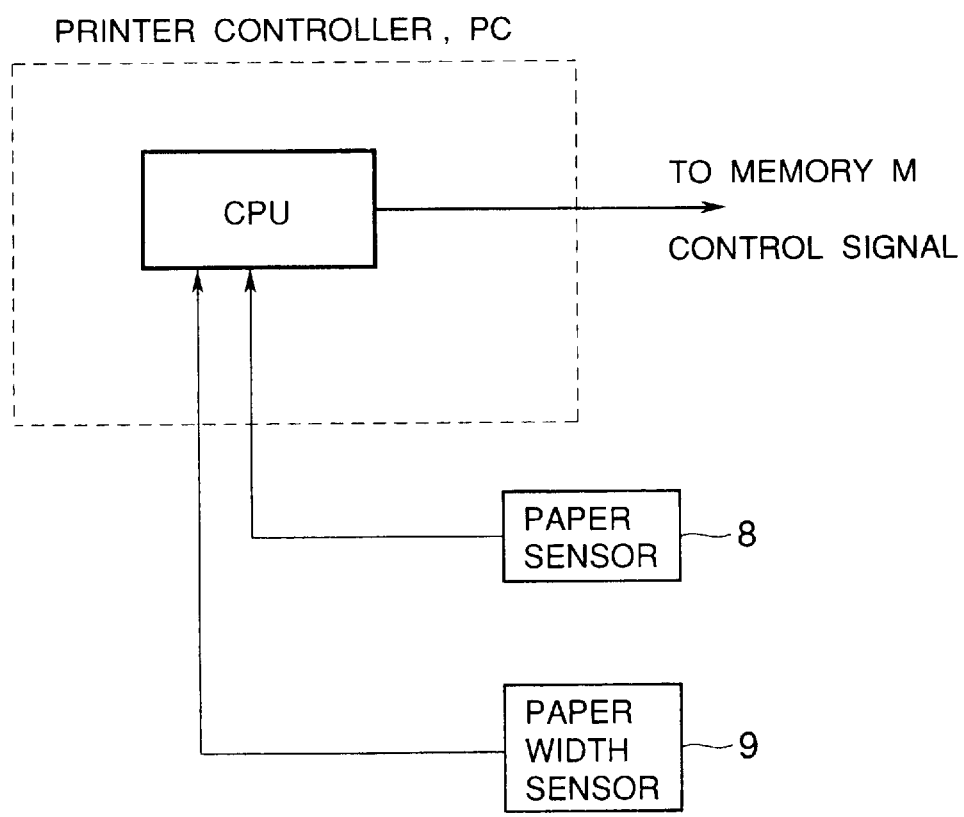
FIG. 9 illustrates a printer controller of the invention.

FIG. 8 illustrates a paper sensor 8 which detects the the paper arriving at the transfer roller 4. The paper sensor 8 takes the form of, for example, a photo interrupter that is pushed by the approaching paper edge to swing in a direction shown by arrow, thereby opening light path 8a in the photo interrupter. FIG. 9 illustrates a printer controller PC and associated paper sensors 8 and 9. The paper 7 is fed from a corresponding paper tray 10 and is transported in a direction shown by arrow A. The paper width is detected by the sensor 9 disposed in the paper tray 10 when the paper 7 is loaded into the tray 10, and the information on the paper width is sent to the printer controller PC.

FIG. 7 illustrates the voltage-current characteristics Sn and Sw of the power supply PS for paper of narrow widths and paper of wide widths, respectively. The solid line portions of Curves $C_H$, $C_N$, and $C_L$ indicate optimum ranges for the respective roller impedances. The memory M stores various values of the Vr and Vm that determine the voltage-current characteristic $S_w$ for wide widths of paper and the voltage-current characteristic $S_n$ for narrow widths of paper. The optimum characteristic is selected by switching among the stored voltage-current characteristics, thereby effecting the optimum transfer operation of the printer.

When the paper width is relatively narrow, Line Sn is outputted from the memory M and the power supply PS is controlled so that the output current Iout reaches points where the line Sn intersects one of Curves $C_H$, $C_N$, and $C_L$ depending on the environmental conditions. Line S̲ is rather flat and therefore the value of the coefficient K2 is zero. Thus, the output current Iout is primarily determined by the value of Vr irrespective of the value of Vm varies.

When the paper width is relatively wide, Line Sw is outputted from the memory M and the power supply PS is controlled so that the output current Iout moves along Line Sw toward points where Line Sw intersects one of Curves $C_H$, $C_N$, and $C_L$ depending on the environmental conditions.

The output current when the output voltage Vout is zero is $I_{a1}$ for Line Sn and $I_{a2}$ for Line Sw. Since $I_{a1}$ and $I_{a2}$ are different values, the values of Vr are also different.

<For transfer rollers having different impedances>

FIG. 12 illustrates voltage-current characteristics for different roller impedances before the printing operation is performed and voltage-current characteristics for the respective roller impedances when the printing operation is being performed. Curves C1 and C2 illustrate the relations between the output currents and the voltages of transfer rollers having different impedances before the paper has been fed between the photosensitive drum 2 and the transfer roller 4, Curve C1 showing the relation for a transfer roller having a low impedance and Curve C2 showing the relation for a transfer roller having a high impedance. Straight Line S3 represents the voltage-current characteristic of the power supply PS before the paper has been fed between the photosensitive drum 2 and the transfer roller 4.

The power supply PS is operated according to the voltage-current characteristic S3 till the paper 7 arrives at the paper sensor 8 in FIG. 8. Immediately after the paper sensor 8 detects the paper 7, the voltage monitor VM sends the digital value of the Vm indicative of the output voltage Vout (Point a1 or Point b1) of the power supply PS to the memory M, and the current monitor CM sends the digital value of the Vc indicative of the output current Iout (Point a1 or Point b1) to the memory M. Then, the Vm and Vc corresponding to Point a1 or b1 are stored in the memory E. If the values of the output voltage Vout and output current Iout indicate Point a1 (low roller impedance), then the memory M outputs the voltage-current characteristic $S_1$ (i.e., values of Vr and K2 for $S_1$) for printing operation, and the power supply PS is subsequently driven according to the characteristic $S_1$. The power supply PS is controlled so that the output current Iout reaches Point a2 on Line $S_1$. If the output voltage and output current indicate Point b1 (high roller impedance), then the memory M outputs the voltage-current characteristic $S_2$ (i.e., values of Vr and K2 for $S_2$) for printing operation, and the power supply PS is subsequently driven according to the characteristic $S_2$. The power supply PS is controlled so that the output current Iout reaches Point b2 on Line $S_2$.

If the power supply PS is controlled according to Line $S_3$ both before and during the printing operation, the transfer roller 4 is driven at Point a3 on Curve C2p or Point b3 on Curve C1p, close to the upper limit of the optimum range. However, the output current Iout and the output voltage Vout of the power supply PS can be controlled so that the transfer roller 4 is charged to a voltage substantially in the middle of its optimum range since the voltage-current characteristic of the power supply PS is switched to Line $S_1$ or $S_2$. The output current when the output voltage Vout is zero is $I_{a3}$ for Line $S_1$ and $I_{a4}$ for Line $S_2$. Since $I_{a3}$ and $I_{a4}$ are different values, the values of Vr are also different.

Likewise, many voltage-current characteristics, not shown, may be stored in the memory for a variety of different roller impedances M, thereby still improving transfer operation. Switching between two or more voltage-current characteristics ensures sufficiently reasonable printing operation for a wide range of roller impedances. Storing many voltage-current characteristics is advantageous in that the printer still operates with an optimum transfer voltage since the printer controller PC automatically selects one optimum characteristic from a plurality of characteristics stored in the memory M even when the roller impedance varies with age.

FIG. 13 illustrates values of output current Iout for output voltage Vout according to two impedances. Impedance 1 is $1.2 \times 10^8$ Ω and impedance 2 is $1.11 \times 10^9$ Ω.

For Impedance 1, the output current Iout is given by, $Iout(\mu A) = -5.0 \cdot \{Vout(kV) - [Vout(kV) \text{ at point } a1]\} + \{Iout(\mu A) \text{ at point point } a1\}$.

For Impedance 2, the output current Iout is given by, $Iout(\mu A) = -5.0 \cdot \{Vout(kV) - [Vout(kV) \text{ at point } b1]\} + \{Iout(\mu A) \text{ at point } b1\}$.

The aforementioned first and second embodiments are advantageous in accurately setting the operating point of the power supply PS within a narrow optimum range of the voltage-current characteristic of the transfer roller. Therefore, the first and second embodiments are suitable for high speed printing operation where the optimum range of transfer voltage is narrow as opposed to low speed printing operation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power supply circuit for use in a printer, comprising:

a voltage generator, generating an output voltage to supply an output current to an external circuit;

a voltage monitor, monitoring the output voltage to produce a voltage-monitoring signal;

an operational section, determining a correction value for the output current on the basis of a reference current of the output current and the voltage-monitoring signal; and a current controller, controlling said voltage generator in accordance with the correction value in such a way that the output current becomes progressively smaller than the reference current as the correction value increases.

2. The power supply according to claim 1, further including a current monitor producing a current-monitoring signal indicative of the output current, wherein said current controller compares the current-monitoring signal with the correction value to provide a larger amount of output current to the external circuit if the current-monitoring signal is higher than the correction value, and a smaller amount of output current to the external circuit if the current-monitoring signal is lower than the correction value.

3. The power supply according to claim 2, wherein the correction value increases with the voltage-monitoring signal.

4. The power supply according to claim 2, wherein the external circuit includes a transfer roller of the printer.

5. The power supply according to claim 4, wherein the transfer roller has an electrical impedance which decreases with increasing environmental temperature or humidity and increases with decreasing environmental temperature or humidity, and the transfer roller is supplied with the output current and is thereby charged to a certain voltage.

6. The power supply according to claim 1, further including a reference current section which sets the reference current for the output current supplied to the external circuit.

7. The power supply according to claim 1, further including a memory in which at least one voltage-current characteristic is stored, the voltage-current characteristic defining the relation between the output current and the output voltage corresponding to the output current in terms of parameters including the reference current and voltage-monitoring signal produced by said voltage monitor, and wherein the operational section produces the correction value on the basis of the voltage-monitoring signal and the voltage-current characteristic.

8. The power supply according to claim 7, wherein said memory stores a first voltage-current characteristic and a plurality of second voltage-current characteristics, said first voltage characteristic defining the output current and the corresponding output voltage before printing operation and said second voltage characteristics defining the output and the corresponding output voltage during printing operation, wherein said power supply is operated before printing operation according to said first characteristic, and said power supply is operated during printing operation according to one of said plurality of second characteristics which corresponds to a current-monitoring signal and a voltage-monitoring signal produced when said power supply is operated according to said first characteristic.

9. The power supply according to claim 7, wherein said voltage-current characteristic varies according to a speed of printing operation.

10. The power supply according to claim 7, wherein said voltage-current characteristic varies according to a width of print paper.

11. The power supply according to claim 7, wherein said voltage-current characteristic varies according to an impedance of the external circuit.

\* \* \* \* \*